United States Patent [19]

Barefoot

[11] Patent Number: 4,975,182
[45] Date of Patent: Dec. 4, 1990

[54] WATERFLOW DIFFERENTIAL ELECTRICAL CHARGING PROCESS FOR ORES

[75] Inventor: Robert R. Barefoot, Calgary, Canada

[73] Assignee: DCRS (Barbados) Ltd., Barbados

[21] Appl. No.: 412,520

[22] Filed: Sep. 26, 1989

[30] Foreign Application Priority Data

Oct. 7, 1988 [GB] United Kingdom ............... 8823611

[51] Int. Cl.⁵ .................... B03B 7/00; B03C 5/00; C22B 11/10
[52] U.S. Cl. .................................. 209/4; 266/169; 75/1 R; 75/118; 75/10.67; 209/10; 209/16; 209/46; 209/63; 209/66; 209/127.1; 209/131
[58] Field of Search ........................ 209/1-4, 209/10, 12, 15, 16, 42, 43, 45, 46, 49, 50, 58, 63, 66, 127.1-127.4, 128, 131; 75/1 R, 10.67, 97 R, 97 A, 118 R; 266/168, 169

[56] References Cited

U.S. PATENT DOCUMENTS

| | | |
|---|---|---|
| 157,192 | 11/1874 | Campfield . |
| 250,358 | 12/1881 | Hill . |
| 329,862 | 11/1885 | Stephens . |
| 662,286 | 11/1900 | Motz ............................ 209/58 X |
| 689,733 | 12/1901 | Lawrence ..................... 209/50 X |
| 816,243 | 3/1906 | Morgan ......................... 209/42 X |
| 937,033 | 10/1909 | Luckenbach ................. 209/66 X |
| 1,429,750 | 9/1922 | Marsh . |
| 1,494,071 | 5/1924 | Marsh .......................... 209/4 X |
| 1,498,911 | 6/1924 | Hatfield . |
| 1,947,035 | 2/1934 | Covington . |
| 1,976,856 | 10/1934 | McLellan . |
| 1,988,720 | 1/1935 | Coyle . |
| 1,988,932 | 1/1935 | Arnold . |
| 2,086,322 | 7/1937 | Ulrich . |
| 2,116,613 | 5/1938 | Bedford . |
| 2,241,392 | 5/1941 | Brown . |
| 2,479,615 | 8/1949 | Guizzetti . |
| 2,706,044 | 4/1955 | Cook, Jr. . |
| 2,825,462 | 3/1958 | Hackney et al. . |
| 2,956,678 | 10/1960 | McConnell . |
| 3,059,772 | 10/1962 | LeBaron ....................... 209/127.1 |
| 3,476,243 | 11/1969 | Ferrara et al. ............... 209/129 |
| 3,493,109 | 2/1970 | Carta ............................ 209/127.1 X |
| 3,729,182 | 4/1973 | Schafer et al. ............... 266/169 |
| 4,451,357 | 5/1984 | LaVigne . |

FOREIGN PATENT DOCUMENTS

| | | |
|---|---|---|
| 67748 | 6/1900 | Canada . |
| 73874 | 11/1901 | Canada . |
| 81761 | 7/1903 | Canada . |
| 174703 | 1/1917 | Canada . |
| 208210 | 2/1921 | Canada . |
| 749192 | 12/1966 | Canada . |
| 816001 | 6/1969 | Canada . |
| 980294 | 12/1975 | Canada . |
| 1111809 | 11/1981 | Canada . |
| 0279200 | 8/1988 | European Pat. Off. ......... 209/127.4 |
| 0144869 | 11/1980 | Fed. Rep. of Germany ... 209/127.1 |

Primary Examiner—Margaret A. Focarino
Assistant Examiner—Edward M. Wacyra
Attorney, Agent, or Firm—Larson and Taylor

[57] ABSTRACT

The invention consists of forming an aqueous slurry of water and particles of ore carrying both metals and/or minerals which are passed at relatively high speed along an electrically isolated path in contact with electrically insulating materials and in the presence of air. This generates a positive electrostatic charge in the water droplets and enclosed particles and a negative charge in the electrically insulating materials through which they are being driven. The water droplets and hence the particles become differentially charged so that when they pass over an oppositely charged negative field, they are driven into the lower oppositely charged field body by the strong force of electrical attraction and the relatively weaker force of gravity. Should the negative collector contain an amalgamating material such as mercury and the ore, as an example contain gold, electrons are exchanged providing instant amalgamation of the surface of the gold. The electrostatic charge is maintained throughout the process until precipitation of the particles is completed.

20 Claims, 14 Drawing Sheets

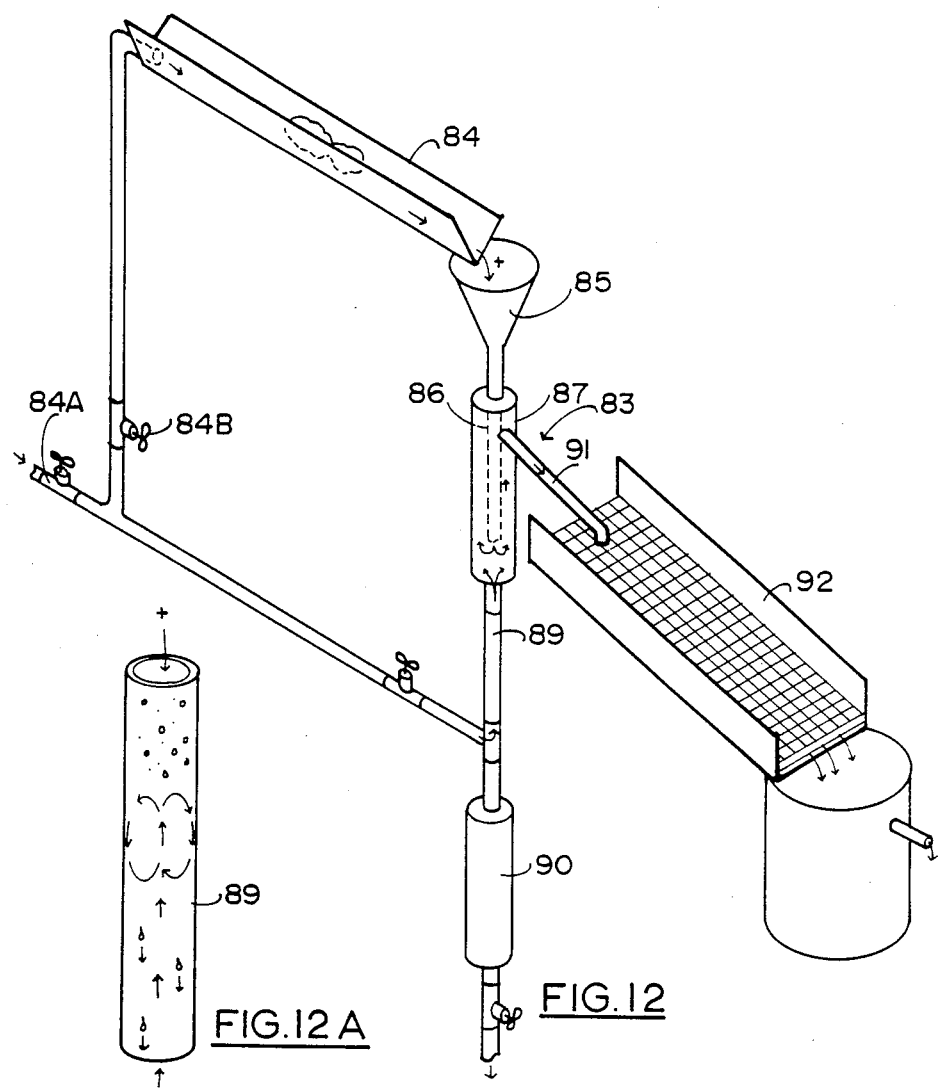

WATERFLOW DIFFERENTIAL ELECTRICAL CHARGING PROCESS FOR ORES

BACKGROUND OF THE INVENTION

This invention relates to new and useful methods and structure for concentrating and recovering metals and minerals from a moving aqueous slurry. More specifically, the invention is directed to simple, economical, fast and efficient methods which cause both metals and minerals in a moving aqueous slurry to become differentially (from the other ore particles) charged positively so that, when they pass over an oppositely charged negative field, they are driven into the lower, oppositely charged field by both the strong force of electrical attraction and the relatively weaker force of gravity. Should the negative collector contain mercury and the ore, as an example contain gold, electrons are exchanged providing instant amalgamation of the surface of the gold.

PRIOR ART

Various methods have been used in the past, and are in present use, which use the principle of electrical charge attraction to separate metals from their ores. Such methods can be categorized into two classes;

(1) electrostatic separation where the metals in dry ore are charged, usually by passing high velocity air through the ore, and are then recovered on an oppositely charged collector, and (2) electrolytic separation where the metals in an ore are first dissolved and then electroplated on an oppositely charged electrode.

(3) electrostatic separation in which the electrostatic field is generated by charged electrodes from an external electrical source.

Other methods are also in current use which employ the gravimetric principle of differential density separation of metals and minerals. Still other methods are in current use that employ mercury amalgamation as a technique for recovering precious metals.

CANADIAN PATENTS

U.S. Pat. No. 67,748, June 15, 1900, F.L. Mason illustrates an inclined perforated cylindrical grizzly which rotates and deposits the ore onto amalgamating tables having stair steps and riffles thereon and containing mercury.

U.S. Pat. No. 73,874, Nov. 26, 1901, Chapin et al ensures a metal house to mechanical amalgamator in which the ore is passed through a series of mercury baths.

U.S. Pat. No. 81,761, July 7, 1903, John Klein teaches a combined concentrating and amalgamating table including a series of copper channels over a base which includes a layer of amalgamated wire gauze situated under the channels.

U.S. Pat. No. 174,703, Jan. 30, 1917, W.P. Clifford et al shows stepped vibrating tables with cups containing mercury. The table has a step-like profile with some sections having cup shaped indentations filled with mercury.

U.S. Pat. No. 208,210 Feb. 1, 1921, R. Leickenbach. This uses a belt covered with a mix of petroleum grease and rubber against which and over which the pulp is moved so that the sticky mix selectively sticks or retains the minerals. A scraper scrapes off the minerals and the sticky surface is continuously replenished.

U.S. Pat. No. 749,192, Dec. 27, 1966, J. Walker et al insures a process for the separation of solids and discloses the use of a moving wire center electrode to induce a non-uniform electrical field to separate wax from oil in an oil/wax mixture.

U.S. Pat. No. 816 001, June 24, 1969, E.B. Ackerman. This shows a system of solvating solid state metals in liquid state metals and is used to reclaim electroplate metals.

U.S. Pat. No. 980,294 Dec. 23, 1975, T. Stimpel. This shows the principal of utilizing an air flow through cloth to induce attractive electrostatic charge.

U.S. Pat. No. 1,111,809, Nov. 3, 1981, B.V. Knelson. This shows a centrifugal separator with gold trapping rings on the surface thereof.

U.S. PAT. NOS.

U.S. Pat. No. 157,192, Nov. 24, 1874, C.H. Campfield et al. This shows a type of sluicebox with removable riffles.

U.S. Pat. No. 250,358 Dec. 6, 1881, C.C. Hill. This shows a mining machine with a screen and amalgamator and an endless fibre mat belt.

U.S. Pat. No. 329,862, Nov. 3, 1885, E.W. Stephens. This shows a conveyor having rounded pans thus forming an ore concentrator.

U.S. Pat. No. 937,033, Oct. 12, 1909, R. Luckenbach. This shows a direct electrical source amalgamation using external power to form the amalgam.

U.S. Pat. No. 1,429,750 Sept. 19, 1922, S.J. Marsh. This shows a sluicebox designed for utilizing amalgamation of fine gold as the ore passes over riffles in the sluicebox.

U.S. Pat. No. 1,498,911 June 24, 1924, H.S. Hatfield. This again uses a direct source electrical charging and a liquid medium such as nitrobenzene, aniline paraffin and the like which are nonconducting or insulators.

U.S. Pat. No. 1,947,035, Feb. 13, 1934, G.L. Covington. This is a complex metal and grounded machine designed primarily for coarse gold. It includes travelling grizzly screens, diverting pans and grizzly bars together with a plurality of sluicing floors equipped with gold saving elements.

U.S. Pat. No. 1,976,856, A. McLellan, Oct. 16, 1934. This patent also uses direct source electrical amalgamation.

U.S. Pat. No. 1,988,720, Jan. 22, 1935, R.M. Coyle. This also uses an external electrical source for the amalgamation step.

U.S. Pat. No. 1,988,932, Jan. 22, 1935, C.R. Arnold. This uses an external electrical car for amalgamation either AC or DC.

U.S. Pat. No. 2,083,322 July 6, 1937, C.B. Ulrich. This shows a multiple sluicebox with tables, grizzly, classifiers and mercury traps.

U.S. Pat. No. 2,116,613 May 10, 1938 R.H. Bedford. This shows a gravity electrostatic separation process in Which air flows upwardly through the material so that conducting particles are pulled down in the field.

U.S. Pat. No. 2,241,392 May 13, 1941, H.D. Brown. This patent also uses an external electrical source for amalgamation.

U.S. Pat. No. 2,479,615 Aug. 23, 1949, R.L. Guizzetti. This is a dry system passing the ground or through electrically charged plates utilizing the principle of electrical precipitation.

U.S. Pat. No. 2,825,462 Mar. 4, 1958, R. Hackney et al. This shows a wet-ore belt stratifier or concentrator in which the inclined ore bed is divided into a plurality of relatively narrow parallel channels.

U.S. Pat. No. 3,493,109 Feb. 3, 1970, M. Carta et al. This shows the electrostatic separation of ores by charging the particles by triboelectricity and again is a dry system.

The invention is substantially unique from all these methods in the following ways:

(1) both the conductive metals and minerals in the ore are charged electrostatically within water droplets in a contained and insulated water slurry.

(2) and aqueous slurry obtains its charge by induction using a high velocity contact with both air and suitable electrical insulating material, rather than from a direct electrical power input The only time that electrical current from an external source is used in the present system is to suppress electrical fields in order to suppress mercury losses where applicable and not for the recovery or amalgamation of gold.

(3) in order to generate the electrostatic charge, the ore moves at a much higher velocity and under much more turbulent conditions than any comparable ore with any of the conventional methods.

(4) the recovery is near instantaneous allowing for very small high speed flow through systems rather than the relatively large conventional processes.

Depending on the metallurgy of the ore involved, a particular Differential Charge Recovery System (DCRS) will be particularly suited to the recovery of gold and/or other precious metals while another DCRS will be more suited for the recovery of the heavy minerals. DCRS systems have low capital and operating costs with relatively high recovery efficiencies at high production rates. As such, in some applications, they can advantageously replace alternate conventional methodology whereas in other applications, they can act as the complementary front-end of an overall recovery system configuration.

OBJECTS OF THE INVENTION

Accordingly, a primary object of this invention is the provision of a simple method of differential charge recovery of precious metals from their ores in a high speed water slurry.

A still further object is the provision of a simple method of recovery of amalgams, mercury and gold from concentrates using a small flow through a differential charge separator.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 12 is a schematic isometric view of the hydraulic charge discharge concentrator.

FIG. 12A is an enlarged schematic view of the observation tube of FIG. 12.

In the drawings like characters of reference indicate corresponding parts in the different figures

DETAILED DESCRIPTION

GENERAL PRINCIPLES

Differential Charging Recovery Systems (DCRS) for a particular ore involve utilization of the combined effects of strong electrical charge differentials and, to a lesser extent, weaker specific gravity differentials to bring about the separation of charged heavy metal or mineral particles. To achieve this objective the systems are designed to induce positive charges differentially (from the less conductive particles) on the metal and mineral particles which will compliment the gravity differential component and to maintain or enhance the charges until separation has been achieved. It has been found that a suitable beneficial natural positive charge is induced on the metal and mineral particles in the water slurry by constructing the water slurry piping from the ore crushing and/or screening facilities to the separation and concentration components, of a suitable electrical insulating material; by using similar materials for the separation and concentration components as well as insulating them from the ground; by providing designed charge inducing surge chambers and waterfall points, and by operating the facility at a high velocity throughput.

EXAMPLE SYSTEM COMPONENTS

It should be noted that all dimensions mentioned in this specification and drawings are exemplary and should not be considered limiting.

The disclosed system is an example of a multicomponent system, as described in the following text, designed to utilize combinations of differential electrical charging and specific gravity differential, which can be combined in various permutations and combinations according to the grade, characteristics, and throughput volume of the system feed. The key individual components may be described as follows:

1. Charging System (FIGS. 1 and 2)

When a droplet of water passes through the air at high speed, electrons are stripped from it's major component, oxygen, leaving the water charged positively while the air is charged negatively. Significant electrical charging can occur as this is the method for producing atmospheric electricity. When a positively charged water droplet containing crushed ore particles passes through air, the particles differentially take on a positive charge according to their molecular makeup. Metals, especially gold, and some minerals readily give up their electrons. If the water droplet is immediately directed into electrically insulated piping, the charge can be maintained, and if the droplet continues to pass through air inside the insulated piping, the positive charge on the droplet and its ore contents can be enhanced. Also, all of the exposed electrically insulated walls of the piping can continue to strip electrons off of the droplet, leaving the surface of the walls charged negatively.

Figure 1:
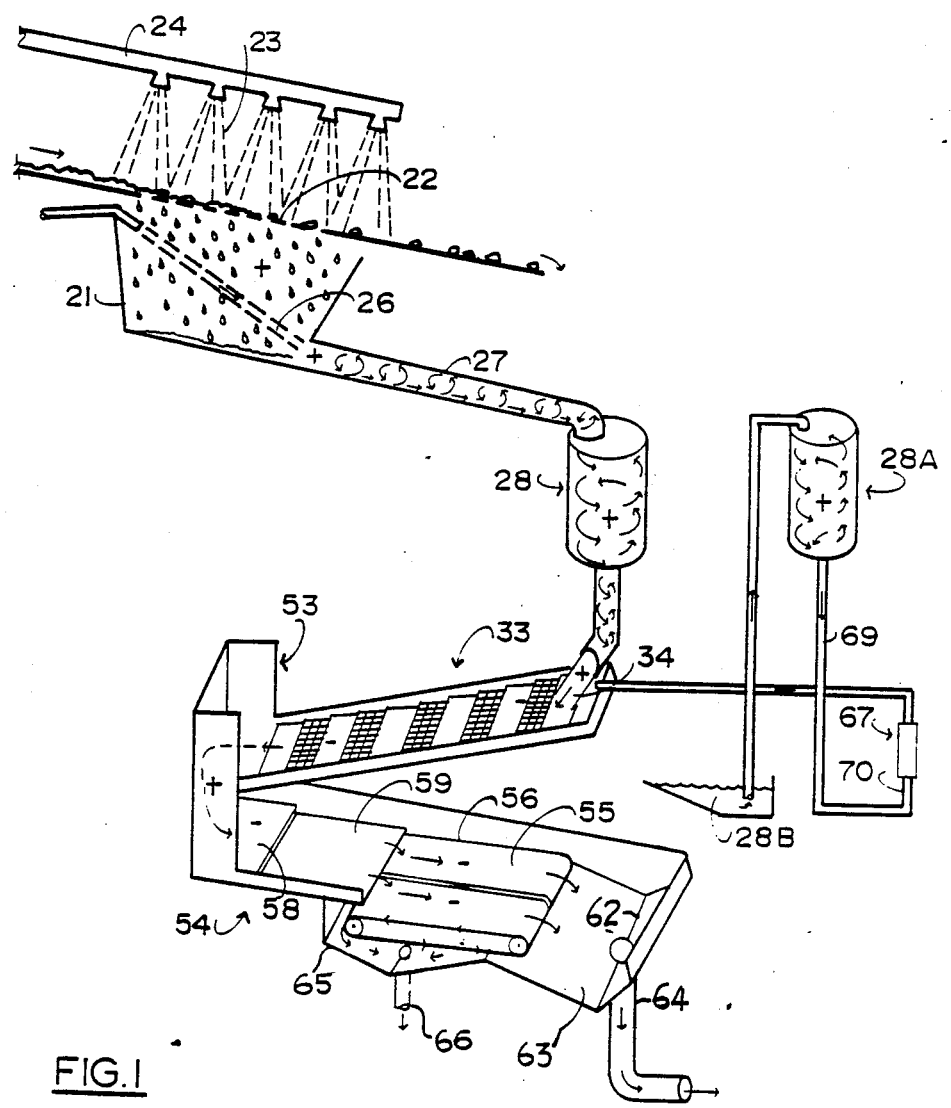
FIG. 1 is a schematic view of a mobile unit for the Differential Charge Recovery System.
Figure 2:
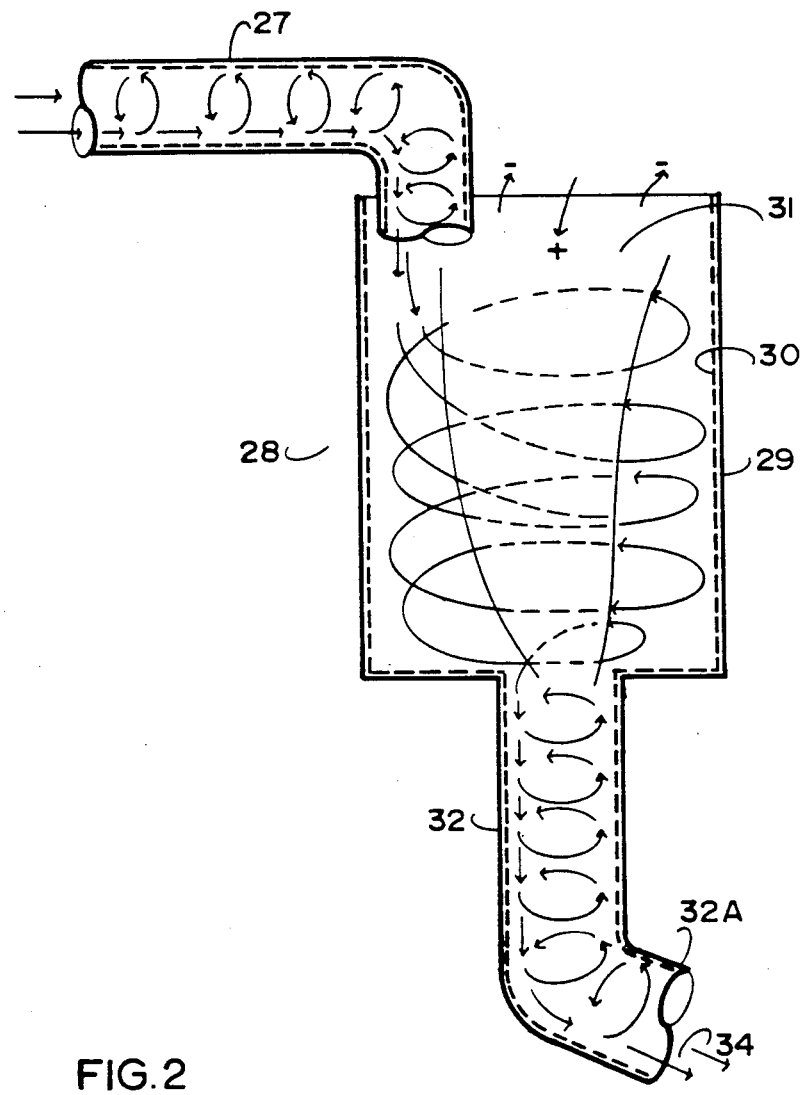
FIG. 2 is a cross-sectional view of the surge chamber shown schematically.

FIGS. 1 and 2 illustrate the type of charging system employed in a DCRS to receive the flow of water slurry of ore or other material via a suitably sized plastic or other electrically insulative material from a conventional crushing and/or wet screening facility (shown schematically in FIGS. 13–15, 18, 19). The system is designed for use with placer type feed stock such as gravel as well as with finely ground mineral or metallic carrying ores.

Means such as conveyor 20 supplies the wet slurry to an intake hopper 21 which may be provided with one or more screens 22 with the slurry being acted upon by water jets 23 from overhead spray bars 24.

Oversized screenings are deposited over the ends of the screens and conventional nugget traps 25 may be provided on these screens.

The remaining slurry which passes through the screens 22 is deposited into the hopper 21 and is acted upon by a high pressure water jet 26 which deposits the mixture of slurry, air and water into the plastic delivery pipe 27. This plastic delivery pipe 27 in FIG. 1 acts as a charge enhancement chamber due to the high velocity water slurry and the entrapped air. A surge type chamber 28 (shown in detail in FIG. 2) takes the form a cyclone and includes the cylindrical casing 29 having a plastic liner 30 which is electrically insulated from ground.

The cyclone forms a vortex 31 which draws in air which mixes with the slurry so that the turbulent slurry and air flow passes downwardly through the outlet 32 with negatively ionized air exhausting both from the upper end of the cyclone casing and the lower end of the discharge 32 indicated by the reference character 32A.

This surge chamber 28 (shown in detail in FIG. 2) serves to regulate surges in slurry feed and also acts as another point of charge inducement as a result of the turbulent flow of water slurry and entrapped air. Induced by flow friction and the resultant electron stripping, a negative charge develops on the inside of the electrically insulated plastic walls 30 of the transfer pipe and surge chamber inducing a more positive charge on the water slurry including it's entrained metal and mineral particles. The greater the turbulence and velocity of the slurry, the greater the differential charge effects resulting in higher efficiencies of recovery for the DCRS, which is the exact opposite to conventional gravity systems that require lowering both turbulence and velocity in order to increase the efficiencies of recovery by gravity only.

2. Electrostatic Concentrator or Collector (AUTOCON) (FIGS. 3–8)

The AUTOCON 33 is an insulated negatively charged collector designed to capture and hold the metals and minerals in the passing slurry that have the greatest positive charge, the preponderance of which is made up of the precious metals due to their electrical qualities. The high velocity water passing over the static plastic and rubber collector (shown in FIGS. 3–6) is the mechanism creating the required negative charge. Should the collector be seeded with a small amount of mercury, the instantaneous exchange of electrons, especially with gold, results in an instantaneous amalgamation of the surface of the metal which further increases the hold on the metal. The latter is demonstrated by the small increases in recovery efficiencies when mercury is used for slurries containing very fine gold.

Although the insulated collector 33 is approximately 2 meters long, almost all of the recovery occurs within a few centimeters of the point of injection 34 of the charged slurry (see FIGS. 1 and 2).

Normally, the conventional gravity sluicebox catches the large "chunk" gold in the first few meters from the point of slurry injection however, many hundreds of meters of sluicebox would be required to recover the fine gold with the same efficiency, and the velocity of the slurry would have to be significantly lowered. Duplicating the AUTOCON's highly efficient recovery of the invisible gold (less than 320 mesh), which make up a major gold component in many gold ores, using only a conventional gravity sluicebox is virtually impossible, as any liberated invisible gold is fine enough to float leaving it basically immune to the force of gravity. Another more appropriate force must be employed such as electrical charge differentials that take advantage of the increase in surface area with the increase in fineness of the gold. Increased fineness means increased electrical charges per unit of weight, which is a measure of the electrical force driving the gold into the AUTOCON collector.

Figure 3:
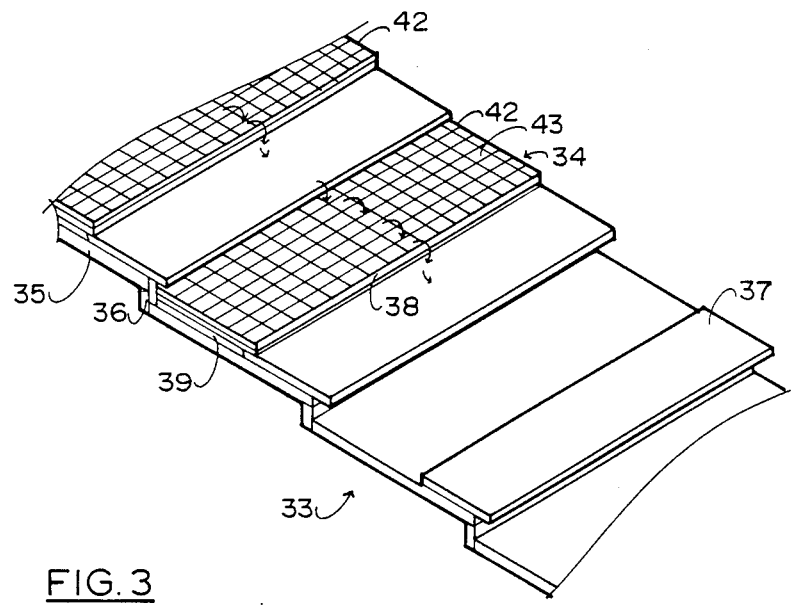
FIG. 3 shows a schematic fragmentary isometric view of the automatic negatively charged collector.
Figure 4:
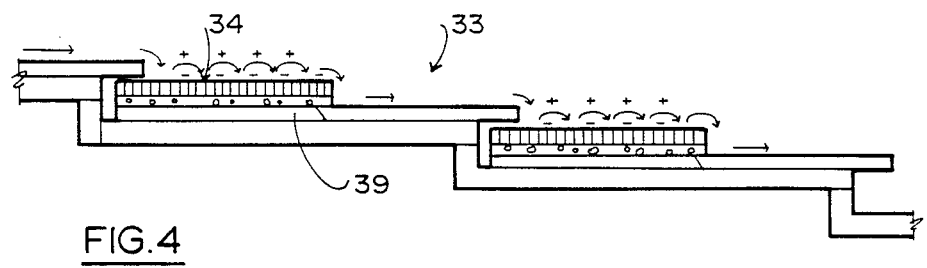
FIG. 4 is a schematic side-elevation of the collector trays of FIG. 3.

FIGS. 1, 3, and 4 illustrate the overall configuration of a fixed specially designed insulated electrostatic collector 33 which can be used as the initial and primary concentrator of the DCRS. In a prototype DCRS 180 tonnes per day mobile test unit, the AUTOCON throat width was 61 cm and the ideal feed rate was 1300 to 1600 litres per minute of 10 parts by weight water and 1 part mineral screened to a maximum 6.35 mm particle size. Such a slurry has an overall typical density of 1.06 kg per litre and results in the passage of some 9 tonnes of mineral per hour through the AUTOCON.

Figure 5:
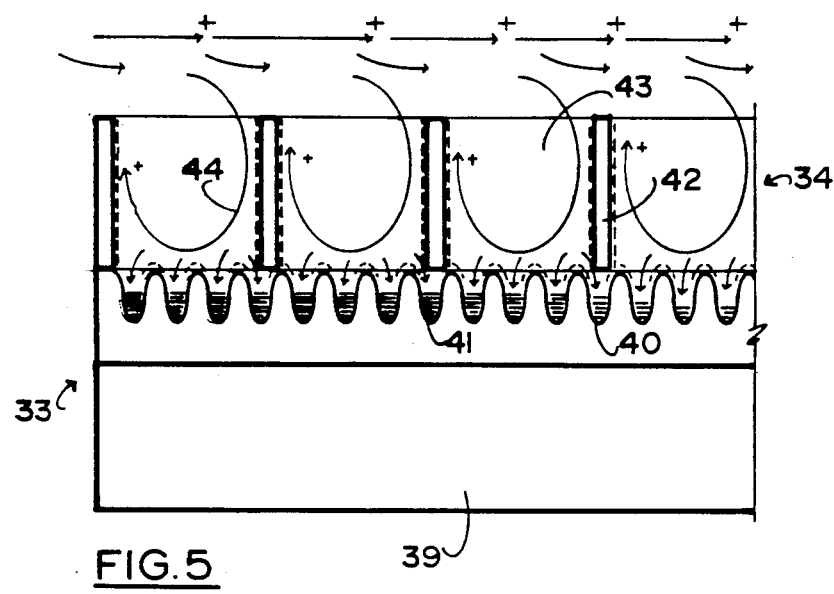
FIG. 5 shows an enlarged fragmentary side schematic view of the slurry path over a type A collector.
Figure 6:
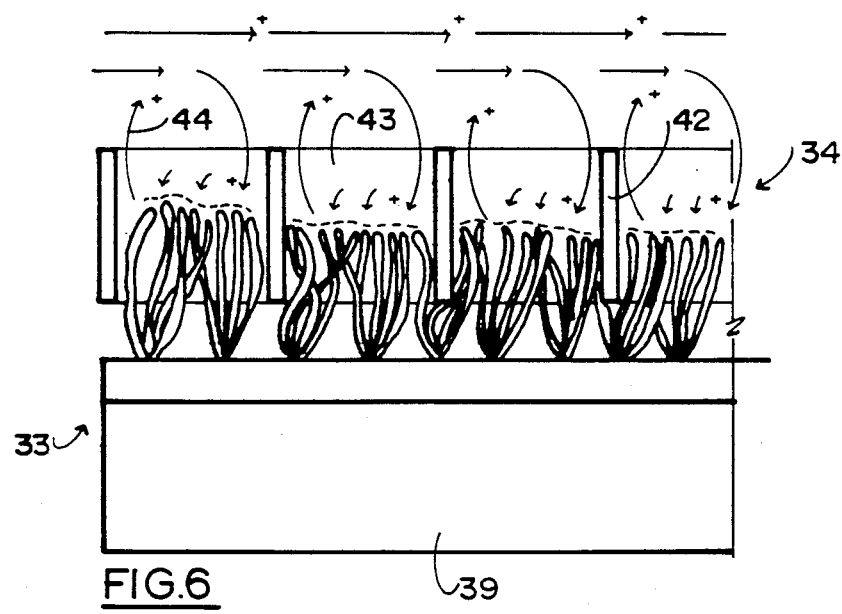
FIG. 6 is a view similar to FIG. 5 but showing the slurry path over an alternative type B collector.

FIGS. 5 and 6 illustrate the detail of the two main types of designs used for the electrically charging collectors in the AUTOCON. The main concentrate is produced using the design in FIG. 5 which is collected regularly, and the design in FIG. 6 has a greater storage capacity, is used in the downstream end of the AUTOCON and collected only occasionally The AUTOCON can be constructed of any waterproof, electrically insulating material that serves to prevent electrical grounding. The entire unit should also be supported on rubber insulators (not illustrated), which is accomplished readily with mobile units that have rubber tires. For low cost ease of manufacture, a good grade of 1.9 cm plywood coated and sealed with fiberglass epoxy is suitable for the structure material.

The collector frame consists of a series of relatively broad steps 35 separated by relatively short vertical risers 36 and upon each step, a removable concentrate collector tray may be engaged so as to provide a series of stepdowns in profile along the axis of the AUTOCON and thus promote turbulent waterfall effects with the air causing regeneration of the positive charge on the slurry. Fall plates 37 extend from just under the front age 38 of the removable collector plates and extend to overlap the front edge of each step and hence the rear edge of each collector plate as clearly shown in FIGS. 3 and 4.

Each collector may be constructed with a 1.9 cm thick solid wood base 39 covered with fibreglass or the like and having a specific commercial belting 40 formed with a surface of small pear-shaped rubber cups 41 each of which is approximately 2 mm deep, 2 mm wide and 5 mm long. An approximately 1.27 cm by 1.27 cm grid 42 of 1.27 mm thick plastic forming cells 43 1.2 cm deep, is fixed over the belting and may be secured as by bolting through it to the plywood base 39. This plastic grid material 42 is very readily and cheaply available as light diffusing grids for fluorescent light fixtures (see FIG. 5).

At 9 tonnes per hour of mineral throughput and with an average air-slurry depth of 2.5 cm over the upper edges of the plastic grid 42, the linear velocity of the slurry across the collector trays 34 is about 3.3 meters per second. As is illustrated schematically by arrows 44 in FIGS. 5 and 6, such a velocity and the configuration of the plastic grid 42 results in a rapid swirl or high speed eddy or turbulent whirlpool effect of part of the slurry down into each grid cell 43, across the floor of the cell 41 (the rubber cupped belting surface) and back up into the main body of the slurry. The turbulence is such that, on average, the grid cells never fill more than one third full with metal concentrate. It should be noted that this aspect of the electrical charge collecting system is opposite to the conventional gravity collecting systems which usually become totally filled almost immediately.

When the slurry is found to be particularly abrasive, such as is the case with most placer ores, the plastic grid 42 on the primary collector tray at the point of slurry injection is replaced with a more durable 4 mm thick rubber grid that has the same grid cell dimensions. This configuration was found to have a very long life.

It has been found that the recovery of very fine to invisible gold can be enhanced somewhat by seeding the upstream end of the AUTOCON with mercury (not illustrated). The mercury spreads itself downstream through the upper ¼ to ½ of the tray system and lays in the rubber cups 41 of the belting in the path of maximum slurry flow. An additional 5 ml of mercury can be injected at the stream end of the AUTOCON every ½ hour of operation to provide fresh mercury exposure. The positively charged gold particles in the slurry impinge on the surface of the mercury droplets, which are lying in and on the negatively charged collector cell floor. Electrons are exchanged and amalgamation occurs, enhancing the entrapment of the gold. If the impinging positively charged gold does not contact mercury, it is pulled deep into the pear-shaped rubber cups 41 by both the forces of electrical attraction and to a lesser extent, by gravity. Here it is protected from the turbulent slurry and it is thereby effectively entrapped.

When crushed and pulverized hard rock gold ore is processed by the AUTOCON it has been found that only a partial liberation of the gold is required to have sufficient gold metal exposure to allow the induced electrical forces to be effective. This translates into lower pulverizing requirements than conventional concentrating systems that require total liberation of the metal to be effective, resulting in significant cost savings It has also been found that where platinum group metals and minerals are present they will accumulate as concentrates in the rubber cups 41 and plastic cell bottoms simultaneously with the gold. Large pieces of heavy mineral crystals also are readily entrapped by the plastic grids.

The AUTOCON system as described requires periodical process shutdowns so that the collector trays 34 can be removed and cleaned out with water into a suitable container to remove and recover the concentrates.

Figure 7A:
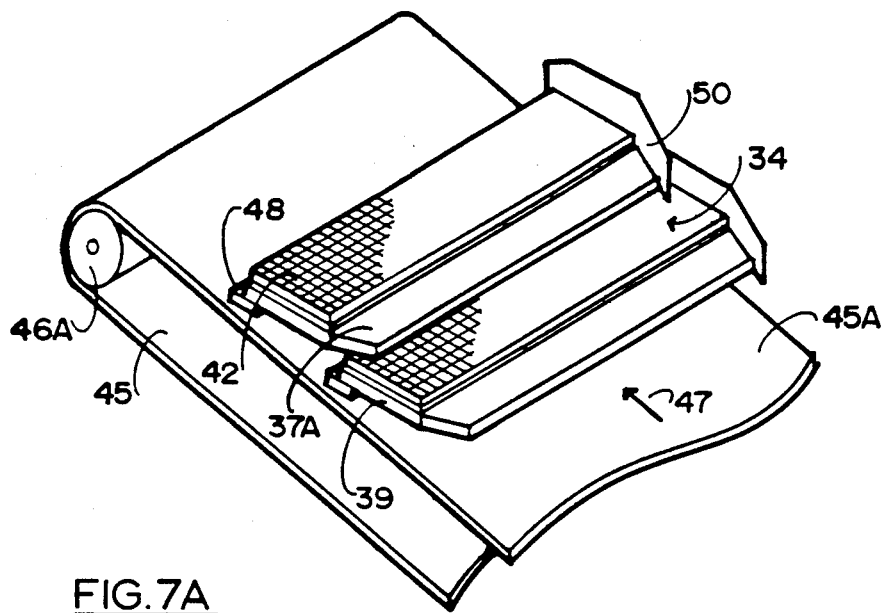
FIG. 7A is a fragmentary isometric view of an alternative belt mounted collector tray system for the electrostatic concentrator shown in FIG. 1.
Figure 7B:
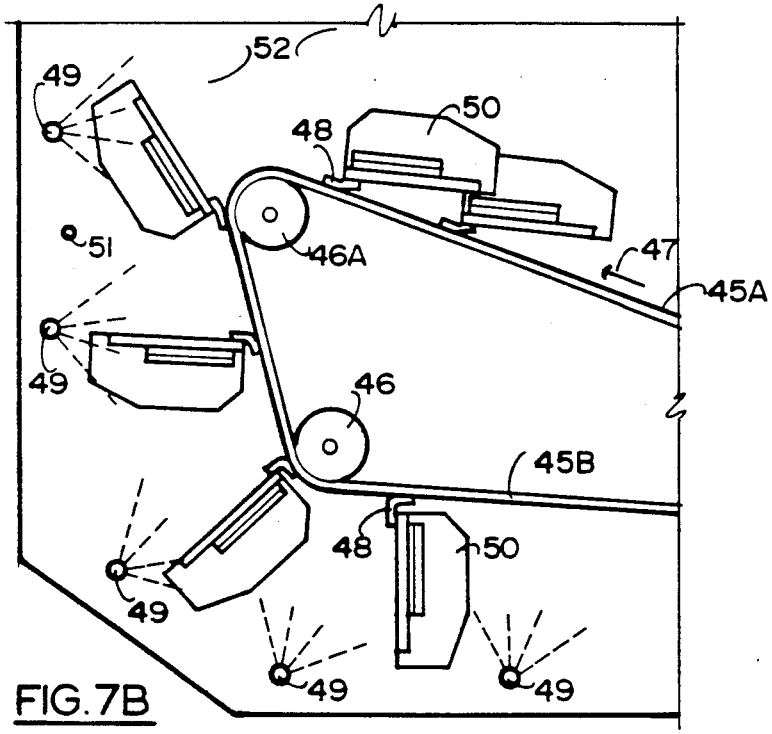
FIG. 7B is a side view of FIG. 7A.
Figure 8:
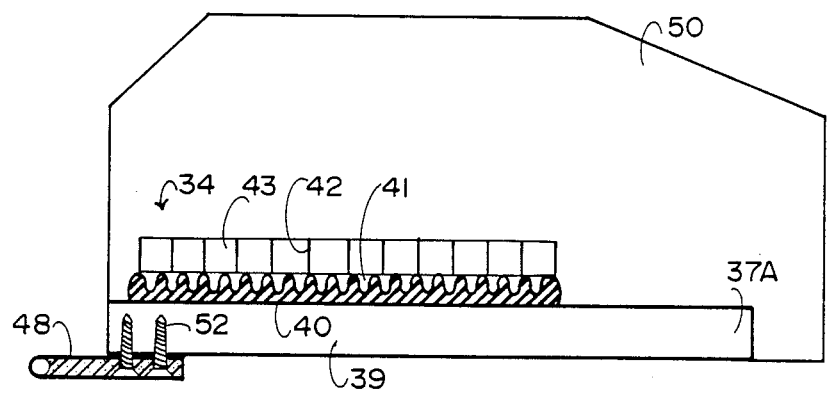
FIG. 8 is an enlarged fragmentary schematic cross-sectional view of a belt mounted collector tray for the automatic electrostatic concentrator of FIGS. 7A and 7B.

To eliminate the necessity of these periodic cleanup shutdowns and to provide for a more continuous empty efficiency (the more empty the trays 34 the more efficient they are), a belt mounted system has been developed as illustrated schematically by FIGS. 7 and 8. The charged tray collector configuration is identical to that of the fixed tray design as previously described and thus the concentrating action is the same.

In this embodiment, an endless rubber or canvas belt 45 is mounted upon rollers 46 see FIG. 7B, one of which is driven (not illustrated) so that the upper run 45A of the belt moves in the direction of arrow 47.

The individual trays which include a fall plate 37A, are hingedly secured to the outer surface of the belt by means of flexible hinges 48 so that when on the upper run, the fall plates overlap the rear edge of the next succeeding tray 34 in a manner similar to the stepped arrangement illustrated in FIGS. 3 and 4.

However the rubber belt 45 on which the trays 34 are mounted by hinges 48, can be either rotated continuously at a selected speed, or rotated periodically, allowing water, that jets from spray bars 49 (FIG. 7B) mounted at the upper end and underneath the belt, to wash the concentrate from the negatively charged cells as they tip over passing over the uppermost pulley 46A. The system therefore does not have to be shut down and evaluations of recoveries are more readily facilitated. It should be noted that the sideplates 50 are only shown on one side of the trays 34 for clarity.

It should also be noted that a transverse bumper bar 51 spans the side walls 52 of the AUTOCON against which the individual trays hit as they pass over the upper pulley 46A thus assisting in the loosening of any concentrate from the bottom of the plastic grid and, more importantly, from the cells 41 within the rubber belting. They then pivot upwardly until they pas the bumper bar and then continue to be engaged by the spray bars 49 until they reach the lower run 45B of the belt as clearly shown schematically in FIG. 7B.

FIG. 8 shows schematically, a longitudinal vertical section of the belt mounted collector tray shown in the embodiment illustrated in FIGS. 7A and 7B with screws 52 securing the flexible belt hinge 48 to the fibreglassed wood base plate 39. Although the multi-celled flexible cupped rubber belting 40 is illustrated, nevertheless it will be appreciated that the base of this mat could be the same as that shown in FIG. 6.

In order to provide optimum operating conditions in terms of throughput and recovery for any particular ore, the four main adjustments that should be evaluated are as follows:

(1) Slurry volume throughput
(2) Slurry density or water:solids ratio, (about 7:1 to 15:1)
(3) Slope of the belt run 45A, (about 13.5 cm to 17.5 cm vertical drop per meter)
(4) Speed and/or frequency of rotation of the belted system.

Although the AUTOCON development was aimed primarily at recovering precious metals and dense precious mineral concentrates, it can also be used to make a concentrate from low grade ores containing minerals such as galena (lead) and cassiterite (tin) Such concentrates require that the ore is only roughly crushed (jaw to 1 cm) and that the belt be either moving continuously or frequently rotated. The larger galena or cassiterite crystals are readily entrapped by the plastic cells which fill quickly and must therefore be cleaned out frequently. Large volumes of low grade ore can be run producing significant quantities of high grade concentrates. Hence ores that are voluminous but too low a grade to be considered for a conventional concentrating process, may be processed economically by the AUTOCON.

Reference to FIG. 1 will show a reverse waterfall illustrated schematically by reference character 53 which receives the slurry from the lower end of the AUTOCON and then directs it downwardly and reverses its direction to enter the next stage indicated by reference character 54 and consisting of an electrostatic-electrogravity concentrator (AUTOMAT). This reverse waterfall is also electrically insulated and preferably lined with plastic to continue the development of positive charge to the particulate matter still remaining within the slurry/air/water mixture.

Figure 9:
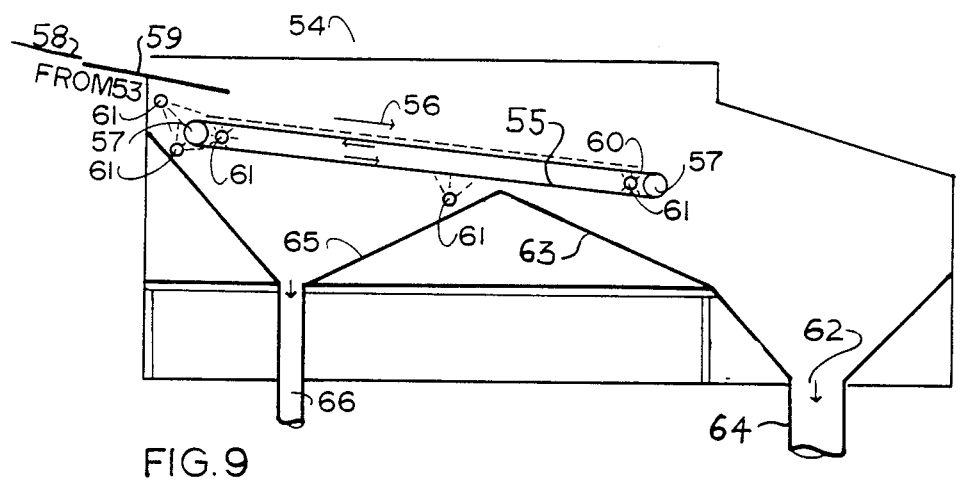
FIG. 9 is a side cross-sectional schematic view of the electrostatic-electrogravity concentrator.

3. Electrostatic-electrogravity Concentrator (AUTOMAT) (FIG. 9)

Another component of the DCRS (Differential Charging Recovery System) is the AUTOMAT 54 which uses a rotating inclined endless rubber cupped belt surface 55 of the type previously described as being suitable to form the floor of the AUTOCON collector trays. The rotation is in a direction opposite to the slurry flow indicated by arrow 56 and the belt width is double that of the AUTOCON trays, thus slowing down the velocity of the slurry and allowing gravity to play a greater role in the mineral entrapment. The belt engages around rollers 57 one of which is driven by the source of power. The slurry receives a positive charge enhancement by falling turbulently from the AUTOCON via a reverse waterfall 53, on to a large negatively charged collector tray 58 (which helps to recover any lost metals), at which point the slurry is forced to reverse directions before flaring out via a transfer plate 59 on to the wider AUTOMAT. The movement of the turbulent slurry across these electrically insulated trays generates the negative charge thereon.

Finely crushed minerals that were less susceptible to charge entrapment alone are now under the increased influence of gravity. Both of these forces effectively entrap the minerals in the rubber cups 60 where they are quickly removed from the turbulent slurry as the belt is rotating and are washed out of the rubber cups by water jetted from spray bars 61 located at the upper end and below the AUTOMAT belt. The concentrate is washed out of the V-shaped base 62 of the AUTOMAT via sloping floor plate 63 under the belt 55, and into a four inch plastic pipe 64 where it exits the unit. Undersized tailings passing over the upper end of the belt against the flow of the slurry, are washed also from the underside of the belt by one or more of the spray bars 61 situated adjacent the upper end of the belt and also part way along the under run thereof. These tailings are washed down the V-shaped floor 65 to a tailing type exit 66 for convenient disposal.

By adjusting the slurry volume throughput, the water/ore ratio, the belt speed and belt slopes, concentrates of pyrite, galena and cassiterite have been efficiently produced from highly pulverized ores.

4. Electroamalgamator (AMTRAP) (FIGS. 10 and 11)

Free milling gold can be extracted from ores or concentrates by a DCRS (Differential Charging Recovery System) that employs instant electroamalgamation of the surface of positively charged gold with a negatively charged droplet of mercury suspended in a current of upward flowing water The concentrate collected from the AUTOCON 33 may be fed to a further surge chamber 28A via a conduit leading from a concentrate collector 28B receiving concentrate from the AUTOCON 33.

Figure 10:
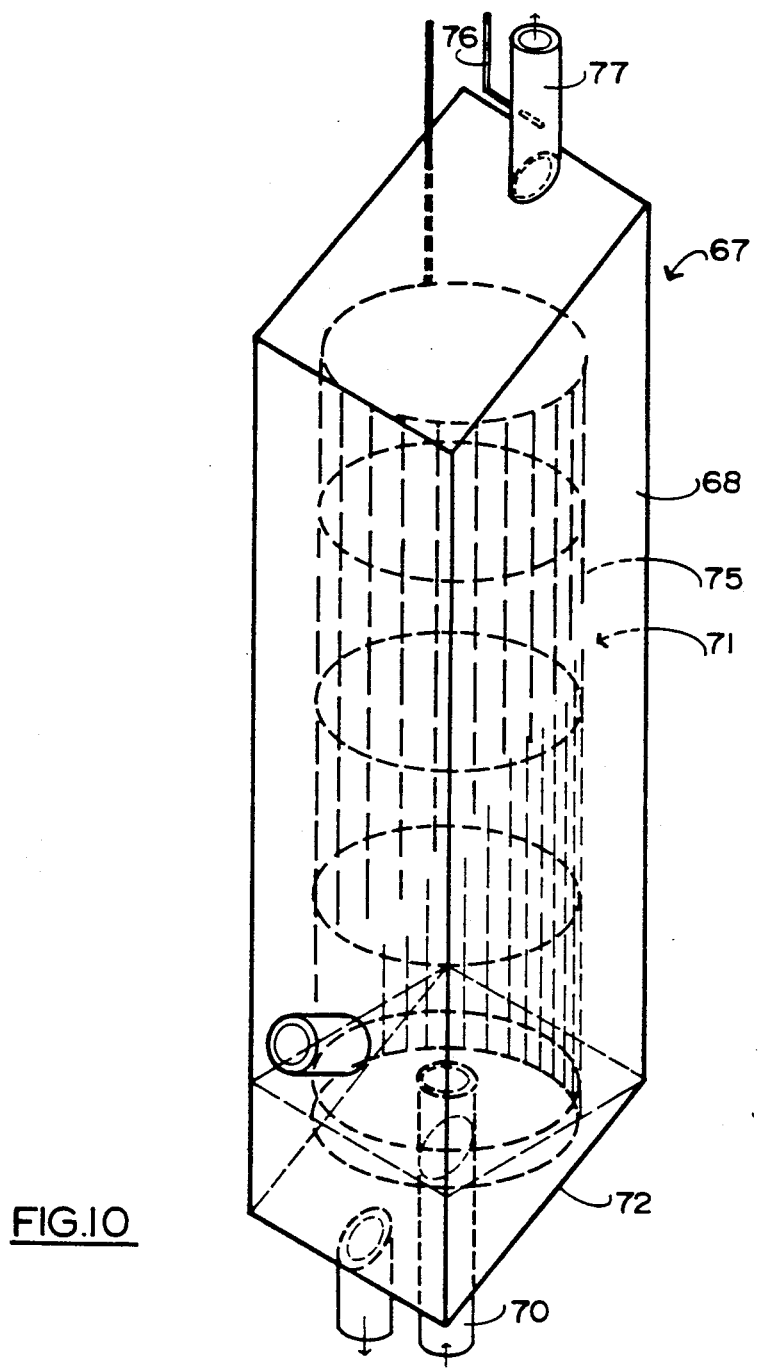
FIG. 10 is an isometric view, of the electoamalgamator shown schematically.
Figures 11A, 11B:
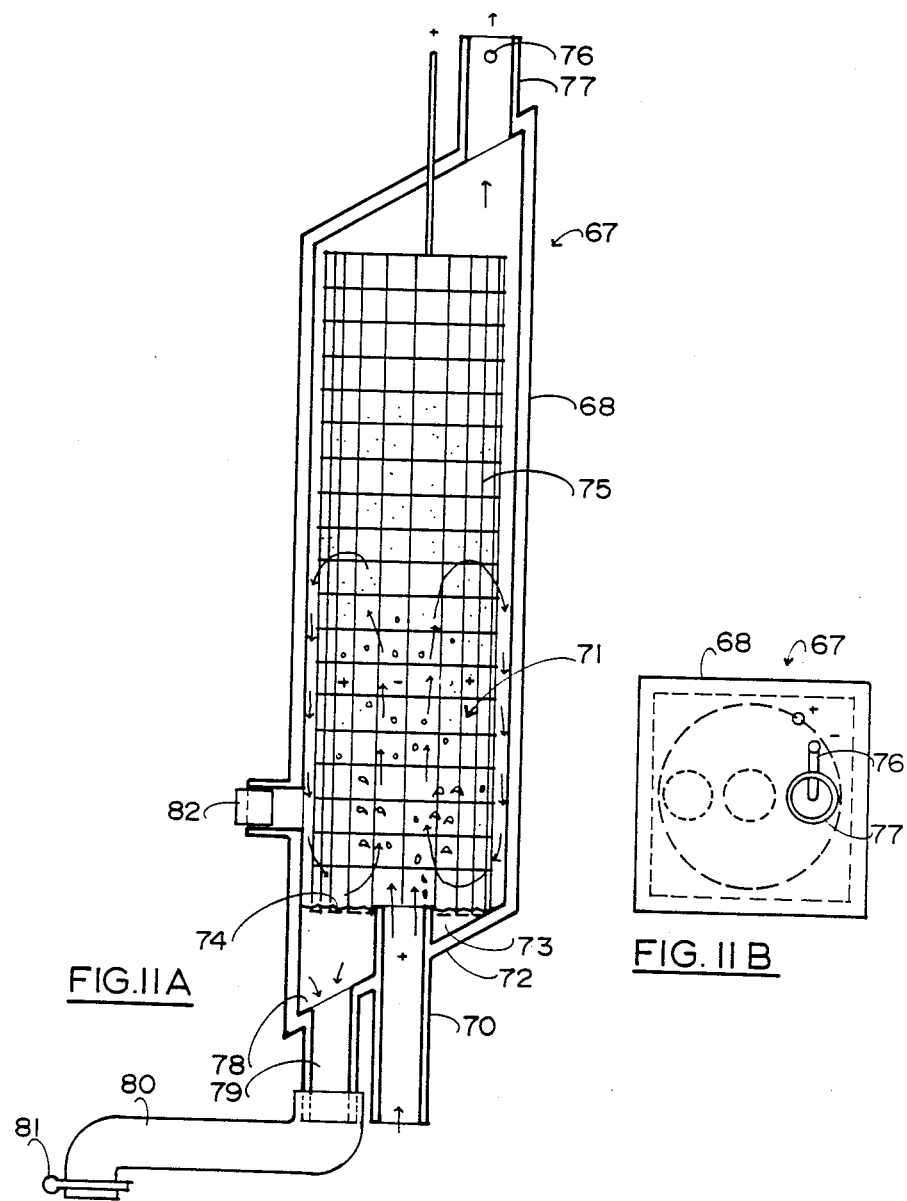
FIG. 11A is a schematic cross-sectional view of FIG. 10.
FIG. 11B is, a schematic top plan view of FIG. 10.

FIGS. 10 and 11 illustrate, as an example, one such design for a single cell 67 (AMTRAP) of a multiple cell system that can be used to recover efficiently (95% to 99%) gold carried upward in a water:ore (10:1 by weight) slurry flowing at a rate of APF, for example, 450 kg of ore per hour. The outer casing 68 is made from an electrically insulating material such as plastic.

FIG. 10 (orthographic projection) and FIG. 11 (side elevation) illustrates the operation of the AMTRAP. Initially water is precharged positively in a surge chamber 28A similar to the surge chamber 28, and then transported through an insulated plastic hose 69 into an inlet 70 at the center of the bottom to a plastic amalgamation cell 71 within the casing 68. This inlet may be set flush with the sloping base 72 of the cell or set approximately 2.5 cm from the base, resulting in a mercury reservoir 73 of 150 ml and 450 ml respectively when the cell is filled to the top of the inlet pipe 70 with mercury 74. At this point a further 100 ml of mercury is injected into the cell with a syringe, the needle inserted into the plastic hose 69 below the inlet 70. Since the reservoir is already full, this mercury is carried up into the center of the cell, suspended as a cloud of thousands of tiny droplets. The water flow is not enough to carry the droplets of mercury up and out of the cell through the upper outlet 77. The water rushing through the cell not only charges the plastic casing 68 negatively, but it also charges the relatively static and suspended mercury droplets negatively as it rushes by.

Next, a direct current potential of 220 volts is set up with a 1.27 cm hollow cylindrical wire mesh grid 75 of the cell 71 and the mercury reservoir 73 into which it extends: both are charged positively and a needle electrode 76 in the upper outlet pipe 77 is charged negatively. The negative needle 76 repels the negatively charged mercury droplets that try to escape out of the cell and the positive grid 75 attracts some of the droplets out of the main flow of water (in the center of the cell) allowing them to fall outside of the grid and down the sides of the cell into the full mercury reservoir 73. This causes more mercury to spill over the upper end of inlet tube 70 and into the high velocity water at the inlet, repeating the cycle.

The ore is then added to the surge tank or chamber 28A where the contained free gold takes on a positive charge. As it enters the cell inlet 70 it is forced to pass through the cloud of negatively charged mercury. Electrons are exchanged and the gold becomes "entrapped" as an "amalgam" (amalgam trap or AMTRAP). Now, because it is part of a much larger particle and because the velocity of the slurry has been dramatically reduced within the cell, the amalgamated gold becomes suspended within the cell and thereby becomes negatively charged by the slurry passing by. Not only is it pushed down by the negative electrode at the top of the cell and pulled over to the positive grid at the side of the cell (removing it from the main flow of the slurry), but now as an amalgam, it is part of a particle that is substantially more dense than the mercury. Thus it readily drops down into the mercury reservoir, settling in the transverse crevice 78 at the bottom of the sloped cell floor. It continues to migrate by gravity through an outlet 79 into a rubber hose 80 with its end securely clamped by clamp 81. This hose is tested frequently for the thick resistant feel of amalgam, and by clamping off the hose close to the outlet 79 by means of a further clamp (not illustrated) and releasing the clamp at the end of the hose, the gold amalgam is readily recovered. This necessitates the replacement of an equivalent amount of mercury as was removed with the amalgam (usually about 66% by weight of the amalgam) into the cell by using a syringe and injecting mercury through a needle that is inserted into the hose at the inlet 70. Alternatively, regular quantities of mercury, based on the grade and rate of processing the ore, can be injected at regular intervals.

Depending on the nature of the slurry and the ability of the negative electrode 76 to repel all of the mercury and amalgam, it may be necessary to operate two or more cells with downstream cells serving as mercury traps. Mercury losses can also be effectively controlled by passing the outlet slurry through an AUTOCON 33. Thus it should be noted that although the 220 volt direct current potential is not an absolute necessity to efficiently recover the gold, it does substantially suppress the loss of fine mercury from the cell. If the polarity is reversed, substantial amounts of ultra-fine mercury are forced out of the cell.

Each AMTRAP cell 67 measures approximately 9 cm by 9 cm per side internally and has an elevation difference between the end of the inlet pipe 36 and the slurry outlet 40 of approximately 30 cm. Operating at a slurry rate of 4500 kg water with 450 kg ore (10 to 1) is sufficient enough to keep the maximum particle size (6.35 mm) slurry from plugging off the cell and at the same time results in excellent free gold recoveries in the 95% to 99% range. Any buildup of dense minerals can readily be removed by a quick opening and closing of a portal 82 on the front of the cell. Other cell sizes and shapes based on the same separation and concentration principles can be used.

The AMTRAP 67 can also be used simultaneously with the AUTOCON 33 by pumping the washed concentrate slurries from the AUTOCON 33 into a surge tank 28A (see FIG. 1), adding water to bring the water-:ore ratio to 20:1, and then operating the AMTRAP 67 at 225 kg of concentrate per hour. This lower feed rate allows the AMTRAP to operate with a higher efficiency rate (99%).

5. Hydraulic Charge/Discharge Concentrator (HCDC) (FIG. 12)

FIG. 12 illustrates a hydraulic charge/ discharge concentrator 83, another member of the differential charge recovery system (DCRS). It employs both a counter-current water flow mechanism and a counter charge/discharge mechanism to make a final cleanup of concentrate from other DCRS systems by way of separating amalgam, mercury and coarse gold that has not amalgamated, from the other constituents. The concentrate is placed in a V-shaped plastic lined feed trough 84 through which a gentle stream of water is run from a convenient source, such as 84A controlled by tap 84B. It is washed down the trough, swirling down a plastic funnel entrance 85, and down a small plastic tube 86 inside an approximate 6.35 cm diameter segregation chamber 87. The charged metal exits the tube at almost the base of the chamber, where it encounters the upward force of a water flow controlled by tap 88 from source 84A. The upward velocity of water in the segregation chamber 87 can be adjusted to force the lighter particles back up and out of the chamber 87 while allowing the much heavier charged metal to drop through the clear plastic observation tube 89 and into an amalgam receiver 90. The large gold amalgam and mercury particles readily drop into the receiver while the same smaller particles almost come to a complete stop, suspended by the water flow. This creates a situation where these originally positive particles can now strip electrons from the water rushing by while passing upward, thus both discharging and allowing them to come together. In the case of the mercury and amalgam, much larger particles are formed and they readily drop into the lower amalgam chamber.

The positively charged overflow coming out of an outlet 91 in the chamber 87 falls onto a negatively charged collector tray 92 where any metals that accidentally escape through the overflow with the light components will be effectively trapped, and can be recycled through the HCDC.

Between 100 kg and 200 kg per hour of rich concentrates can be processed. The HCDC is also very effective at separating dense minerals from their concentrates.

C. APPLICATIONS AND DCRS CONFIGURATIONS

Figure 13:
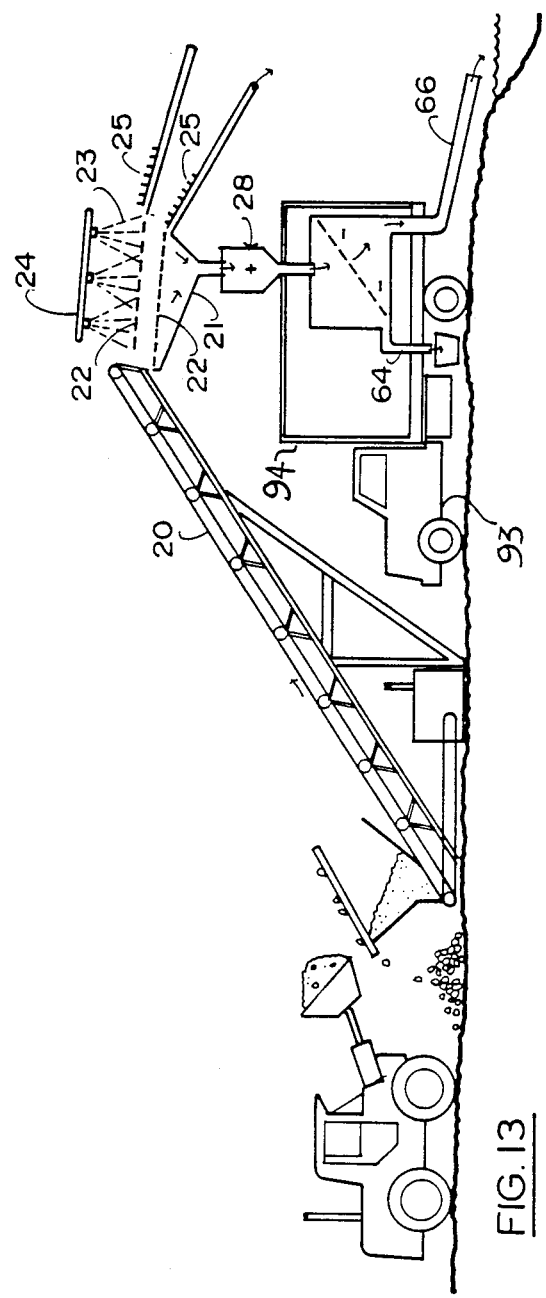
FIG. 13 is a schematic side-elevation of the Differential Charge Recovery System showing a typical setup for the mobile test unit.
Figure 14:
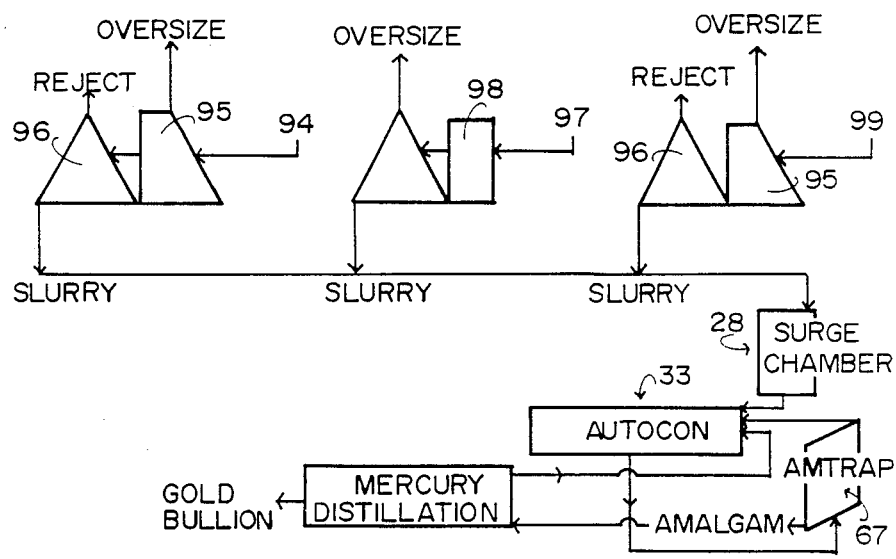
FIG. 14 is a schematic block diagram of the system of FIG. 13.

1. Self Contained Mobile DCRS Test Unit (FIGS. 13 and 14)

A self contained metal and mineral concentrator/ extraction DCRS, the main component layout of which is illustrated by FIG. 1, has been built into a 2.7 tonne truck 93 mounted in an enclosing box 94 measuring 2.37 meters high by 2.29 meters wide by 4.95 meters long.

The mobile unit contains one AUTOCON 33, two AUTOMATS 54, a four-celled AMTRAP 67 and one HCDC 83 operatively connected together. In addition, it contains a small chemical assay and control laboratory, distillation equipment, and a large fume hood, as well as a storage area for the surge tank, pumps, hoses, generators, fuel tanks and chemicals (not illustrated).

This mobile unit can be driven on to an ore testing site, and if the equipment necessary to feed the required minus 6.35 mm sized ore particles in a 10:1 (water:ore) slurry is operational, can within minutes be processing at a rate of up to 180 tonnes per day (three man crew). As such it is suitable for large sample testing of placer deposits, waste dumps or suitable tailings ponds. Since screening minus 6.35 mm material from placer gravels generally only constitutes 1/5 to ⅓ of the total insitu gravel, such processing rates represent tests of 900 to 540 tonnes per day respectively from such deposits.

Alternatively the mobile DCRS unit or scaled up customized version of it can be used to process ores from small or remote deposits that cannot otherwise be economically exploited using conventional recovery systems.

2. Free Milling Gold Recovery from Placer, Waste Rock or Tailings

Such applications would dictate the use of an AUTOCON 33 as the prime concentrating component of the DCRS, followed by an AMTRAP 67 to process the rich concentrates. As illustrated by FIGS. 13 and 14, the concentrate produced would be upgraded using an HCDC 83. The amalgam so obtained would then be distilled to allow the mercury to be returned to the system and to produce the product bullion.

In FIG. 14, schematic representation of the system is shown for treating a variety of originating materials such as placer gravel, mine waste dump material and tailings pond material.

In the case of placer gravel which enters at 94, it first passes through a grizzly screen 95 and then through a wet screen 96 to form the slurry which is then transferred via conveyor 20 to the spray bar and water jet entrance 24 and 26 and thence to the tube 27 to the surge chamber 28.

With mine waste dump material entering at 97, it may pass through a crusher shown schematically at 98 and thence through the grizzly to the conveyor 20 in the form of slurry.

With tailings pond material entering at 99, it passes through a grizzly screen 95 and thence to the wet screen 96 once again leading to the entrance to the differential charge recovery system.

3. Recovery of Free Milling Gold From LODE Ore (FIG. 15)

Figure 15:
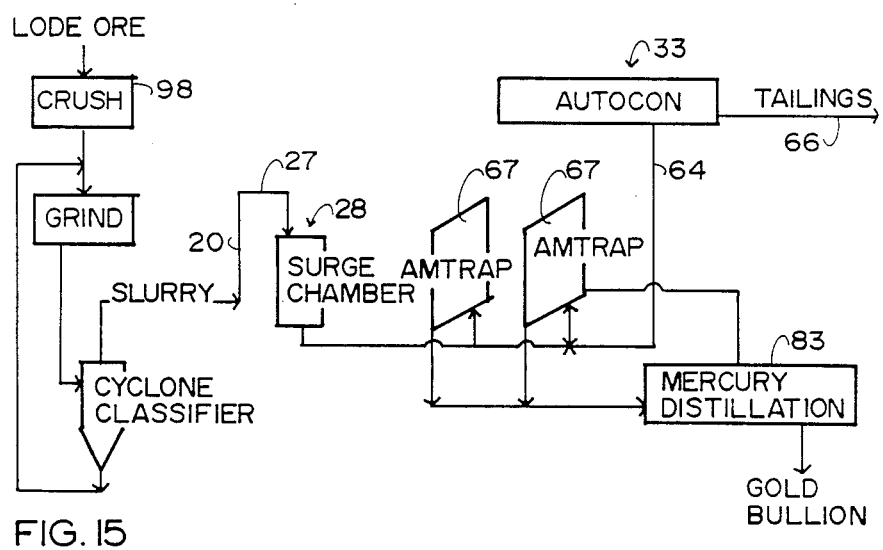
FIG. 15 is a schematic block diagram of the Differential Charge Recovery System specifically for the recovery of free milling gold.

FIG. 15 shows the use of a bank of AMTRAPS 67 to process a slurry of high grade ore (in block diagram) crushed to liberation size. Low grade ores can, alternatively, be upgraded first by processing a rougher crush slurry through the AUTOCON 33, and then processing a slurry of the produced concentrate crushed to liberation size through the bank of AMTRAPS 67. Since only a rough crush is required to expose some of the surface of the gold contained in the ore, which is all that is required to produce efficient concentrates from the AUTOCON 33, the ore can be concentrated at a fraction of the capital and operating costs of the relatively huge and more complex conventional gravity or flotation based mill circuits. Also, because the DCRS systems have a retention time of just a few seconds to produce their products, the AMTRAP 67 can also yield acceptable recoveries at a fraction of the capital and operating costs of more complex conventional amalgamation or cyanide based mill circuits which require from hours to days to produce their products. This latter aspect of conventional systems also necessitates both the use of huge retention vessels as well as much larger (or many more smaller) production units to meet the production capacity of the DCRS.

There are some ores that contain components which hinder the successful economic extraction of gold with a conventional cyanide system. Use of the AMTRAP 67 has proven effective with some of these ores. Also ores, that prove difficult to process through a conventional amalgamation circuit because of surface coatings on the gold (such as oxides, magnitites and organics), can be readily processed by an AMTRAP.

4. Mixed Ores Extraction: Free Milling and Sulphide Bearing Gold (FIG. 16)

Figure 16:
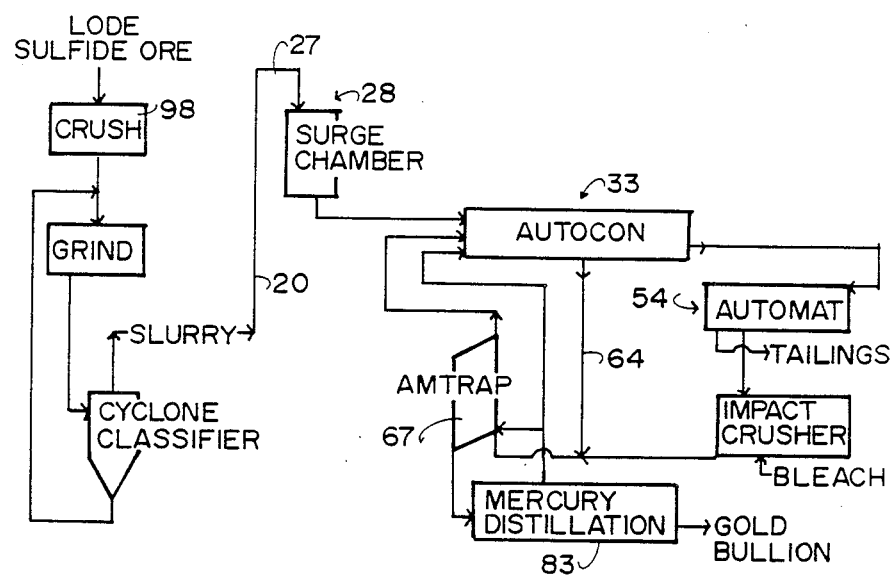
FIG. 16 is a schematic block diagram of the Differential Charge Recovery System for free milling and sulphide bearing gold.

FIG. 16 illustrates (in block diagram) the use of the AUTOCON 33, AMTRAP 67, AUTOMAT 54 and the HCDC 83 to process such an ore. Mixed ores must be pulverized finer than a straight free milling ore, in order to liberate the gold bearing sulphide from its' gangue material. The positively charged and finely ground slurry mixture is first run through the AUTOCON 33 where the liberated gold metals are pulled into the negatively charged collector trays 34, are automatically washed out, and are then processed through an AMTRAP 67 where the gold is removed as an amalgam. The charged slurry then passes from the AUTOCON 33 on to the AUTOMAT 54 where the gold bearing sulphide, which has more positive charge than the non bearing sulphides and minerals, becomes entrapped in the negative rubber cups 41 and is quickly washed out and collected. This sulphide concentrate is different from the sulphide concentrate produced from a conventional froth floatation circuit in that it tends to contain only the sulphides bearing gold rather than the floatation concentrate that tends to contain all of the sulphides in the ore. Depending on the nature of the ore, this richer concentrate can be processed one of two ways: if the gold is complexed inside the sulphide, the concentrate should be processed in a conventional cyanide circuit as in FIG. 17, and if the gold is attached to the surface of the sulphide it should be passed into a impact crusher with commercial bleach added in small quantities to both create an impact shattering along the metal contaminated crystal planes of weakness as well as a pH shock which together liberate the gold as in FIG. 16. This liberated gold can now be collected by charging its' slurry and recycling into the AUTOCON 33, eliminating the necessity of a costly and relatively bulky cyanide circuit. This Differential Charging Recovery System configuration has been found to work well on gold-on-sulphide mixed ores, which are quite numerous worldwide.

5. Black Sand Extraction: Gold in Platinoid Placer Concentrate (FIG. 17)

Figure 17:
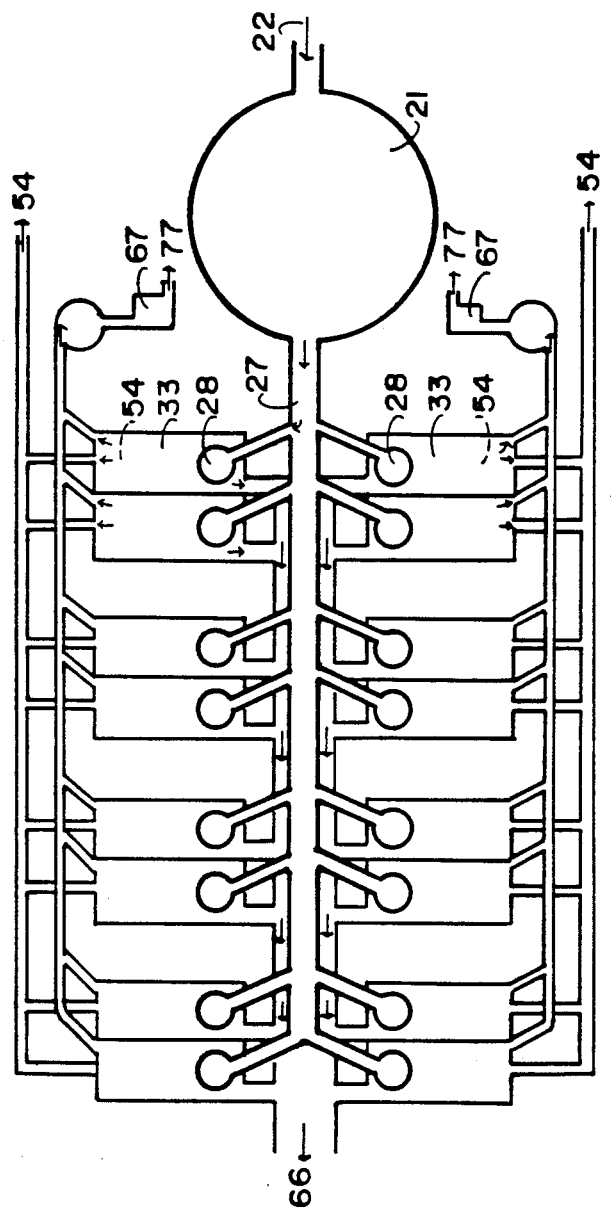
FIG. 17 is a schematic side-elevation of a Differential Charge Recovery System for free milling gold and sulphide concentrates.

FIG. 17 illustrates the use again of the AUTOCON 33 as the prime component to produce a gold and/or platinum rich concentrate from a placer deposit. Ultra fine platinum metals that normally pass right through a conventional sluice box, can easily be charged positively and readily become entrapped in the AUTO-CON's negative collector trays. Also the conventional sluice box will collect significant amounts of gold bearing black magnetite; conversely the AUTOCON strips the gold from the magnetite allowing most of the magnetite to pass out into the tailings while entrapping the gold in a much richer (usually platinum bearing) black sand. The gold can readily be recovered by passing the concentrate through an AMTRAP 67 while the potentially rich platinum concentrate tailings should be sent to the appropriate refinery for assessment. It should be noted that since a DCRS unit is effective in capturing platinum metals and since the amount of concentrate produced is usually a fraction of the concentrate produced by a conventional gravity system, the potential for an economical platinum concentrate is quite high.

6. Galena Extraction: Low Grade Surface Ores or Waste Dumps (FIG. 18)

Figure 18:
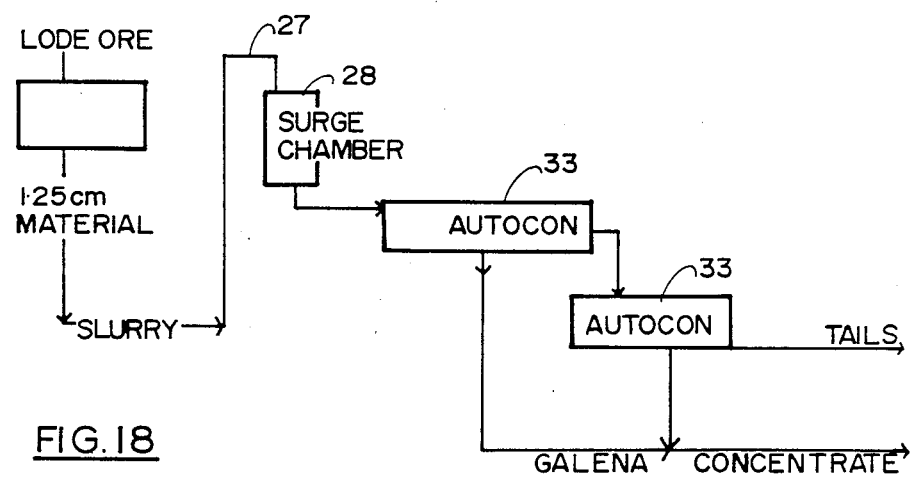
FIG. 18 is a schematic block diagram of the Differential Charge Recovery System for concentrating low grade lead ore.

FIG. 18 illustrates (in block diagram) the use of a DCRS to produce an economical lead concentrate from readily accessable low grade surface ores or waste dumps. The system is composed of a surge tank and one or more AUTOCONS 33 in series, and is capable or processing 900 tonnes per day of 1.25 cm crushed material. By experimentation with each ore, the rate of automatic cleanout is established. The bulk of the concentrate is composed of the larger galena crystals, and the efficiency is in the 40% plus range. However, since the process is so quick and inexpensive to run and since the concentrates can be so rich, ores that could not even be considered by conventional systems can become quite attractive using a DCRS. The basic prerequisite is an abundance of readily attainable low cost ore. Also, efficiency is enhanced by the presence of silver in the galena.

7. Cassiterite Extraction: Low Grade Tin Ore (FIG. 19)

Figure 19:
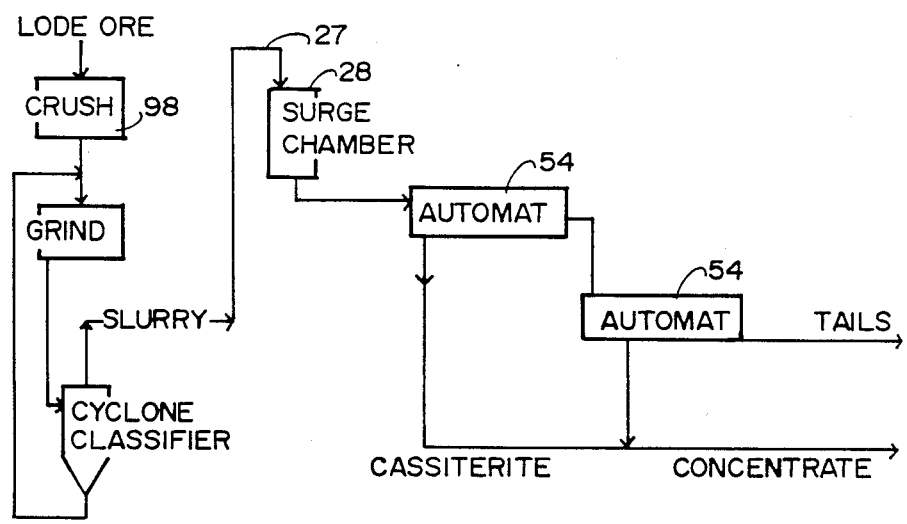
FIG. 19 is a schematic block diagram of the Differential Charge Recovery System for concentrating low grade tin ore.

FIG. 19 (in block diagram) illustrates the use of a DCRS system to produce a concentrate from low grade tin ores. The system is composed of a surge tank and one or more AUTOMATS 54 in series. The rate of rotation of the rubber cupped belt in each unit is established by experimentation on eaCh particular ore. Efficiencies of 70% plus have been attained on finely pulverized ore. The small DCRS system replaces a relatively huge and capital intensive array of conventional Wilfley Tables, which together are capable of producing concentrates at a comparable efficiency.

It will be appreciated that other combinations of the various elements that make up the differential charge recovery system can be made depending upon circumstances and design parameters and have caused the material being processed.

ADVANTAGES OF THE SYSTEM INCLUDE THE FOLLOWING:

1. A method of using differential charge effects in a water/ore slurry to collect the metals and/or minerals contained in the ore by (a) Preparing the ore by reducing it to a subdivided particle size range sufficient to obtain sufficient exposure of the metals and/or minerals and if necessary, screening to a maximum particle size of 6.35 mm or thereabout.

(b) Making a suitable water slurry of the subdivided ore which generally is in the 10:1 (water:ore by weight) range or thereabout.

(c) Precharging the slurry positively by passing it at high velocity through air and/or over nonconductive material stripping off electrons so that the most conductive components such as precious metals and minerals' take on the bulk of the charge.

(d) Passing the positively charged slurry over an insulated collector which is negatively charged by stripping electrons from the high speed water that passes overhead, and/or passing the positively charged slurry up through a cloud of mercury which was negatively charged by stripping electrons from the water that rushes up to suspend it and pass by it.

(e) Designing the negative collector in such a way that when the strong electrical field of force, assisted by a much weaker gravitational force, pulls the positively charged metals and materials down into it, they become entrapped out of the turbulent slurry flow, and that when the negative collector contains mercury, electrons will exchange with any positively charged gold that contacts the mercury, creating an instantaneous surfacial amalgamation which further entraps the gold.

(f) Placing a negative charge above the negative cloud of mercury and a positive charge on the side wall screen which extends into the pool of liquid mercury below, so that when electrons exchange between the positively charged gold in the passing slurry and the mercury droplets thereby entrapping the gold, the resulting instantaneous amalgam which becomes suspended and negatively charged, is both pushed and pulled down into the pool of mercury by both electrical fields of force: the newly created amalgams are both larger and denser than the original mercury droplets and gravity can now also play a greater roll in pulling them down into the pool of mercury below.

(g) Designing the differential charge recovery systems in such a way that the charge on the slurry is being constantly regenerated, such as: overlapping the collector trays creating a turbulent series of waterfalls, transporting the slurry to each system through conduits made of electrically nonconductive materials such as plastics, passing the slurry through a surge tank before entering each recovery system, and by employing any other technique that forces the slurry to breakup and mix with air or any other substance that will strip electrons from the moving slurry.

(h) Automatically removing metals and/or minerals from the charged collectors prior to their becoming full to the point of lost efficiency.

2. The method, without any mercury in the system and applied to the separation of the constituents of any mix of subdivided solid particles in a water slurry where some particles will differentially accept an electrical charge and are sufficiently more dense that they can be efficiently separate from the lesser charged lighter particles on the basis of complementary electrical and gravitational forces and hence can be collected and concentrated.

3. The method specifically designed to concentrate and recover mercury, natural or otherwise, and its amalgams from a water/ore slurry.

4. The method applied to recover free gold and other precious metals from heavy mineral concentrates.

5. The method specifically designed to concentrate and recover minerals that contain associated precious metals.

6. The method used primarily to prepare a concentrate of any mineral concentratable from its ore gangue on the basis of differential charge capacities supplemented by differential densities.

I claim:

1. A method of separating a selected ore component from a particulate ore, reduced to a subdivided particle size range sufficient to obtain exposure of the metal and/or mineral content, characterized in the steps of:
   (a) providing a slurry of the ore in water consisting of water droplets with said particles carried thereby in a ratio of approximately ten parts by weight of water to one part of weight by ore,
   (b) electrostatically charging the water droplets and the particles carried thereby by passing them through air at relatively high velocity and along an electrically insulated path in contact with electrically insulating material, sufficient to induce a positive charge in said droplets and particles carried thereby and a negative charge in said electrically insulated material, by stripping off electrons whereby the most conductive components of said particles attract and retain the bulk of the electrostatic charge of the droplets, said ore particles accepting said electrostatic charge differentially when mineral and/or metal constituents thereof have different electrical conductivities and specific gravities and hence can be separated individually principally by the differential conductivities and to a lesser extent, by gravity,
   (c) capturing components of the slurry by passing the electrostatically charged slurry through a collector having capturing means therein with an electrostatic charge opposite to the electrostatic charge of said slurry, and
   (d) separating from the collector, components of the slurry captured by said capturing means.

2. A method according to claim 1 wherein the step of electrostatically charging the slurry further comprises passing the slurry along the electrically isolated path in a turbulent flow.

3. A method according to claim 2 in which the step of capturing said components of said slurry includes passing the positively charged slurry upwardly through a cloud of negatively charged mercury droplets, said mercury droplets being negatively charged by stripping electrons from the water that moves upwardly to suspend same and pass by said mercury droplets.

4. A method according to claim 1 including electrostatically charging the capturing means of the collector by passing the slurry therethrough at high velocity, and then generating high speed eddies or turbulent whirlpools in said slurry.

5. A method according to claim 1 in which the step of capturing components of the slurry, comprises collecting particle components of the slurry from a high velocity flow thereof, passing said particle components of the slurry over an electrostatically charged surface with particle collecting formations therein, whereby particle components of the slurry settle out of the high velocity flow by gravity and electrostatic attraction to the surface, whereby the relatively strong electrical field of force within said droplets assisted by the weaker gravitational force thereof, pulls the positively charged metals and materials downwardly onto said electrostatically charged surface.

6. The method according to claim 5 wherein the step of capturing components of the slurry comprises contact in the slurry with an amalgamating agent in the collector.

7. Apparatus for separating components from a particulate ore, comprising slurry producing means for producing a slurry of the ore in water droplets; characterized in that there is provided charging means comprising an electrically isolated path bounded by electrically insulating materials; and flow generating mean for generating a high velocity flow of the slurry through the path, to induce an electrostatic charge in the slurry; and collector means for receiving charged slurry from the charging means and including capturing means with an electrostatic charge opposite to that of the slurry, means for contacting the slurry with the capturing means for capturing components of the slurry, and discharge means for discharging uncollected components of the slurry.

8. Apparatus according to claim 7 wherein the charging means comprise a surge chamber means for generating a turbulent flow slurry and air, said surge chamber means having all surfaces thereof contacting the slurry, made of an electrically insulating material.

9. Apparatus according to claim 7 wherein the capturing means comprises means for generating high speed eddies or turbulent whirlpools in the slurry in contact with the capturing means.

10. Apparatus according to claim 9 wherein the means for generating eddies comprise a grid of electrically insulating material and means for passing the slurry over a top surface of the grid, said capturing means further comprising retaining means positioned below the grid for receiving and retaining components of the slurry out of the eddies.

11. Apparatus according to claim 10 wherein said retaining means comprises a sheet of electrically insulating material and cups formed on either surface thereof.

12. Apparatus according to claim 10 wherein said retaining means comprise an electrically insulating mat with fibres projecting from a top surface thereof.

13. Apparatus according to claim 7 wherein the collector means comprises a first collector for collecting components of the slurry from a high velocity flow, means for receiving slurry from the first collector and producing a lower velocity flow, and a second collector, said second collector receiving the lower velocity slurry flow for collecting components of the slurry therefrom.

14. Apparatus according to claim 13 wherein the second collector comprises an electrically insulating surface with pockets formed therein.

15. Apparatus according to claim 14 wherein the electrically insulating surface of the second collector comprises a surface of the moving belt.

16. Apparatus according to claim 7 wherein the capturing means comprise an amalgamating agent in the collector means.

17. Apparatus according to claim 16 wherein the amalgamating agent is in suspension in the collector means, and wherein the discharge means comprise an overflow.

18. The apparatus according to claim 7 which includes means for generating an electrostatic charge on a slurry of particulate material in water, comprising:
   flow generating means for generating a high velocity, turbulent flow slurry in air;
   surge chamber means for receiving the turbulent flow of slurry from the flow generating means and receiving atmospheric air, mixing the slurry and air and discharging the mixed slurry and air in a turbulent flow, the surge chamber having an inner surface of electrically insulating material for inducing an electrostatic charge in the slurry, and means for discharging ionized air from the surge chamber.

19. The apparatus according to claim 7 in which said capturing means includes a collector for collecting components from said electrostatically charged slurry as a flow of the slurry passes along a collector surface, said collector comprising:

high speed eddy generating means on top of said collector surface for generating high speed eddies or turbulent whirlpools in the flow of slurry passing thereover, said eddy generating means being comprised of an electrically insulating material; and component retaining means positioned below the eddy generating means for receiving and retaining components of the slurry out of the high speed eddies, the retaining means comprising an electrically insulating material, said component retaining means including a waterfall structure, said waterfall structure regenerating the electrostatic charge of said droplets and particles.

20. Apparatus according to claim 7 in which said capturing means includes means for separating components from an electrostatically charged slurry of particulate or in water, comprising:

a chamber;

means for producing a suspension of amalgamating agent in the chamber;

slurry inlet means for admitting slurry into the chamber;

means for generating an upwards flow of liquid within the chamber;

means for withdrawing amalgam from adjacent the bottom of the chamber: and means for drawing tailings from adjacent the top of the chamber.

* * * * *